March 11, 1958     A. J. MEYER     2,826,187
METHOD AND MEANS FOR THE CONTROL OF COMBUSTION
IN INTERNAL COMBUSTION ENGINES
Filed Dec. 3, 1956     2 Sheets-Sheet 1
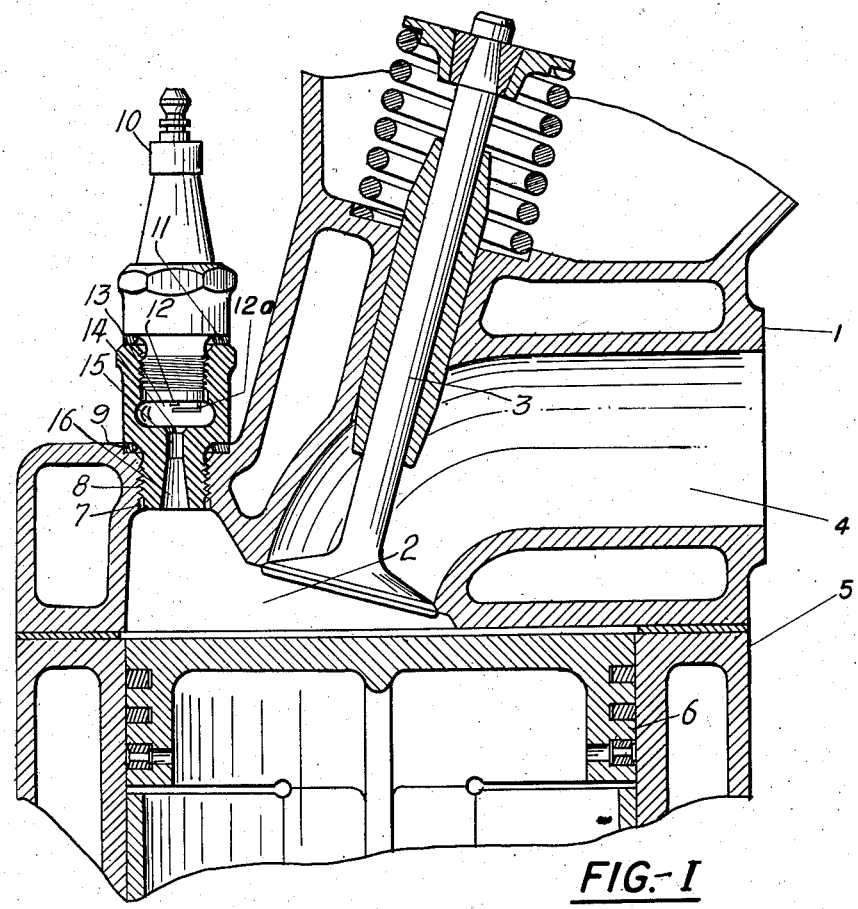
FIG.-I
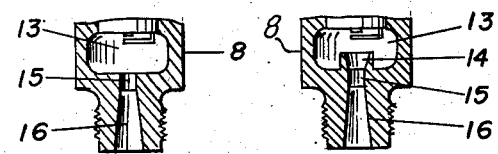
FIG. IV     FIG. V
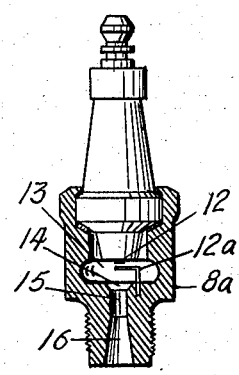
FIG. II
INVENTOR.
Andre J. Meyer
BY
Hauke & Hardesty
Attorneys.

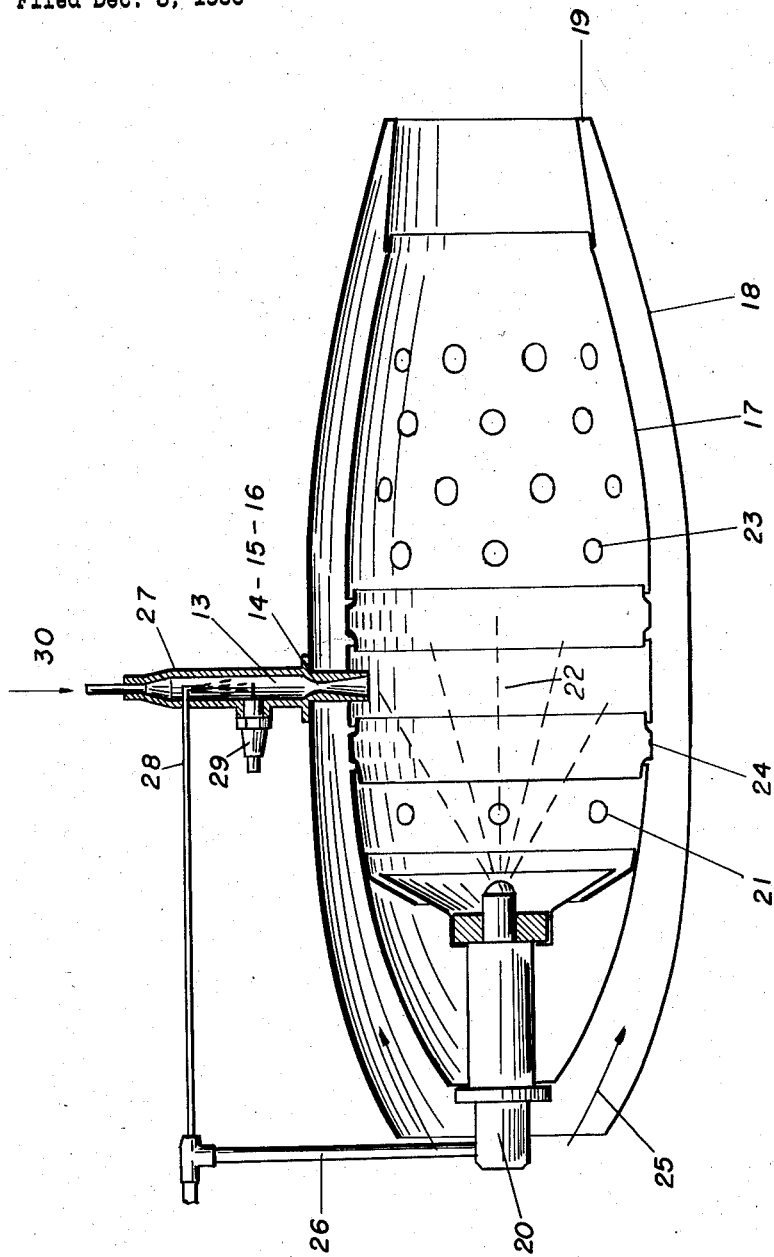

2,826,187

METHOD AND MEANS FOR THE CONTROL OF COMBUSTION IN INTERNAL COMBUSTION ENGINES

Andre J. Meyer, Rocky River, Ohio

Application December 3, 1956, Serial No. 625,808

13 Claims. (Cl. 123—191)

This invention has to do with the suppression of detonation in the operation of internal combustion engines and is particularly concerned with certain discoveries, whereby it is made possible to reduce detonation to an appreciable degree, without the use of special fuels or of so-called anti-knock compounds.

It is well known that the efficiency attainable in internal combustion engines is a function of the compression ratio used. In piston engines this ratio is defined as the ratio of maximum to minimum volume encountered within the cylinder during the completion of a cycle of operations. In gas turbines, where the volume within the machine is invariable, the ratio of maximum to minimum pressure, encountered during the cycle of transformations to which the medium is subjected is often called the compression ratio.

It will be clear that the same term as applied to these two types of engines does not represent the same condition of the gas mixture and it must be understood that the volumetric ratio of the piston engine corresponds to a pressure ratio equal to this volumetric ratio elevated to a power of about 1.33. Thus an 8 to 1 compression ratio in a piston engine corresponds to about a 16 to 1 pressure ratio. However, whichever definition is used, in all types of engines it may be said that the dominating factor determining the efficiency is the compression ratio, the higher the ratio the better the efficiency.

In practice the compression ratio cannot be arbitrarily selected at some high level. In gas turbines there are aerodynamic considerations, which limit the ratio that can effectively be used in any given design. In reciprocating engines the tendency of the fuel to knock or detonate, giving rise to localized high pressures and temperatures, limits the ratio to a value that cannot be surpassed without causing the destruction of the mechanism. It has long been known that the limiting ratio in this case varies with the structure of the fuel molecule and much research and development has been done with the object of finding or creating fuels less subject to detonation, so as to permit the use of higher compression ratios. Much progress has been made along these lines, so that today we have a variety of fuels and fuel blends for which the highest useful volumetric compression ratio varies between 2 and 10 or more, under otherwise comparable conditions.

Extensive researches to determine the effect of temperature and pressure on the onset of detonation have yielded the following relationship:

$$p^{1/3} \times T^{5/2} = C \qquad (I)$$

where $p$ and $T$ are the absolute pressure and temperature of the end gas prior to detonation in spark ignition engines, or at the end of compression in diesel engines. It was found that the value of the constant C is characteristic for each fuel, the value being higher for fuels of higher anti-knock value. The formula is to be understood in this manner:

Whenever the value of the product on the left hand side of the equation exceeds the value of the "C" characteristic of the fuel, there will be detonation.

Nearly all progress in the development of better efficiency in internal combustion engines during the last 30 years has been due to the success of petroleum scientists in continually raising the C values of the fuels on the market. Only very little can be attributed to alteration of combustion chambers and combustion processes, or mechanical design of the engines. It is, however, to be noted that the fuels permitting the use of higher ratios always are more expensive to produce and that the yield per barrel of crude is less for such fuels. Consequently the economic efficiency has hardly been improved by the progress that has been made.

Thus far gas turbines have been insensitive to the quality of the fuel used, but this is only because the pressure ratios commonly used have been lower than those encountered in reciprocating engines. Roughly a pressure ratio of 8 to 1 in a gas turbine is no more severe on the fuel than a 4.75 to 1 compression ratio in a piston engine. Since economic and other considerations will also force the use of ever higher pressure ratios on the gas turbines, it is to be expected that these engines in the near future will begin to demand higher grade fuels, unless something can be done to suppress detonation under conditions of high temperature and pressure.

Recently it was found that the Equation I, though applicable under average conditions, is no longer valid, if the time during which combustion takes place is substantially reduced. In one case, where this time was reduced to about 20% of what is common practice, there was no sign of detonation in a high compression engine, when using a fuel of very low anti-knock value. This has been explained by the broad statement that detonation cannot take place if the time element is small enough.

More likely there exists a relationship like:

$$p^{1/3} \times T^{5/2} \times t^x = C_1 \qquad (II)$$

where $t$ is the time necessary to complete combustion, $x$ is an unknown positive exponent and $C_1$ a fuel constant about $1000^x$ times smaller than C used in Formula I.

The means thus far suggested for reducing the combustion time lead to serious complications, more expensive construction and less flexible operation of the engine. I have, however, discovered that the time necessary to complete the combustion can be reduced appreciably by injecting in the combustion chamber a small stream of heated gas accelerated to supersonic speed. When operating in this manner indicator cards show a much more rapid pressure rise, detonation is suppressed to a marked degree, the economy is improved as much as 15% and the engine runs smoothly, accelerates rapidly and idles properly. Moreover these results can be obtained in a simple, inexpensive manner so that none of the difficulties thus far experienced with accelerated combustion need be anticipated.

It is an object of this invention to provide simple means for reducing the time normally required to complete the combustion in internal combustion engines. Another object is to reduce the tendency of mixtures of low grade fuel with air to detonate, in order to permit the use of less expensive fuels in engines, which to date will only function properly when supplied with high quality combustibles. A further object is to devise a novel method of ignition consisting of three phases as follows:

*Phase 1.*—Spark or hot spot ignition of a quantity of combustible mixture, confined in a small space, separated from the main combustion chamber. The combustion in this space will follow the conventional pattern, such as is encountered in either constant volume or constant pressure combustion chambers. It is essential, however, that the pressure in the space after combustion is equal or preferably substantially higher than twice the pressure in the main combustion chamber at that time.

*Phase 2.*—Expansion of the burned gases present in said space through a nozzle, so as to discharge them at supersonic speed into the main combustion chamber.

*Phase 3.*—Ignition of the charge in the main combustion chamber by the supersonic jet thus injected.

The construction necessary to accomplish the objectives listed above will be explained by reference to the appended drawings, in which:

Fig. I is a cross section through the combustion chamber of a conventional reciprocating engine of the overhead valve type, showing a suitable adaptation of the invention.

Fig. II is a cross section through a sparkplug constructed in accordance with the invention, thus making a unit assembly of the special parts shown in Fig. I.

Fig. III is a cross section through the combustion chamber of a conventional gas turbine, diagrammatically showing the adaptation of the invention.

Figs. IV and V show alternate designs of the nozzle.

Referring to Fig. I, it will be noted that the cylinder head 1 is strictly conventional, containing the main combustion chamber 2, valve 3 and suitable gas passage 4 for the admission or escape of the gases as the case may be. This cylinder head is fastened in the usual manner to the cylinder block 5 in which the piston 6 reciprocates, it being shown in top dead center. No alterations are made in any of the parts mentioned and any other form of spark ignition reciprocating engine may be substituted for the one illustrated.

In the threaded opening 7, normally provided for the insertion of a sparkplug, an adapter 8, sealed by a gasket 9, is inserted. A sparkplug 10 is screwed into the adapter, a gasket 11 being used to prevent the gases contained therein from escaping.

The electrodes 12 and 12a of the sparkplug 10 are protruding into the antechamber 13, which through the transfer passage 14, 15, 16, in the general form of a De Laval supersonic nozzle, communicates with the main combustion chamber 2. The passage is formed with a converging portion 14 and a diverging portion 16. Between these portions 14 and 16 there is a throat 15 which may be a cylindrical section, but this is not essential. The passage may also be formed with curved walls as indicated in Fig. III, or the diverging portion alone may be used. Whichever form of transfer passage is preferred, depends on the compression ratio and operating condtions of the engine, but it is essential that the portion nearest to the main combustion chamber is divergent, its largest diameter being on the side of this main combustion chamber.

The operation of the invention when adapted to reciprocating engines is as follows:

When the piston is in bottom dead center at the start of the compression stroke, the gas pressure in the cylinder, combustion chamber 2 and antechamber 13 is about the same as that in the gas passage 4. During compression this pressure rises in the cylinder and also in the combustion chamber. Therefore a small amount of the mixture is forced through the transfer passage into the antechamber 13, where it will be in turbulent motion, because of the relatively high velocity acquired in the transfer passage.

At the end of the compression stroke the gas pressure in the antechamber and main combustion chamber will be about the same. Upon ignition the pressure in the antechamber may rise rapidly to about 3 or 4 times the value of the pressure in the main combustion chamber. As a result part of the content of the antechamber will be expelled through the transfer passage which is so formed and proportioned that the burned gases will arrive in the main combustion chamber at supersonic speed. The interference of this high velocity jet with the relatively stagnant charge in the main combustion chamber causes the formation of a shock wave, which rapidly transverses this chamber, effecting a rise of pressure and temperature behind its front, thereby igniting the as yet unburned gases. Since the shock wave traverses the main chamber at a much greater rate of speed than the speed of normal flame propagation, the combustion will be completed in less time than usual with a corresponding reduction in the tendency of the fuel to detonate. In experimental work carried out on a variable compression engine it was found possible to ignite diesel fuel at 7 to 1 compression ratio without any sign of detonation.

Referring to Fig. II it will be noted that the antechamber 13 and the transfer passage 14, 15, 16 is incorporated in the outer shell 8a of the sparkplug in which further the insulator assembly is mounted in the conventional manner, thus reducing by two the number of parts necessary.

Referring to Fig. III, the combustor shown consists of an inner liner or flame tube 17, attached to the outer jacket 18 at 19. The flame tube supports a nozzle 20 and is perforated by holes 21, which furnish the combustion air to the combustion zone generally indicated by 22. The tail end of the flame tube is perforated by holes 23, through which the cooling air enters to be mixed with the burned gases. Cooling rings 24 serve to promote skin cooling of the combustion zone. In operation compressed air enters in the direction of the arrows 25 in the space between the jacket and the liner, from where it passes through the various holes and slots to the inside of the flame tube. Fuel is supplied to the nozzle by means of the tube 26. All parts thus far mentioned are of conventional design and may be substituted by similar elements of different design.

The element incorporating the invention is generally shown at 27. It consists of a fuel supply line and nozzle 28, a glowplug 29, a combustion space 13 and a converging-diverging nozzle 14, 15, 16. A small quantity of air at a pressure equal to or in excess of twice the pressure in the combustion zone is supplied continually at 30.

In the operation the engine is started in the usual manner, or the glowplug is relied upon to effect the ignition. As described before, a supersonic jet is formed and maintained by means of the element 27, with the consequence that shock waves are continually generated within the combustion zone. In the same manner as described for the reciprocating engine these waves will accelerate the rate of combustion with the consequence that detonation is suppressed, thus permitting the use of lower grade fuels in engines of high compression ratio.

In the foregoing description reference was made to a De Laval type supersonic nozzle. Although this type of nozzle is widely known by the name of its inventor, the principles may not be generally understood. It has long been known that increasing the pressure ratio across a tubular orifice will increase the exit flow velocity until it equals the velocity of sound. Beyond this point further increase of the pressure ratio will not result in higher terminal velocity, no matter how high the inlet pressure is carried. De Laval found that it is only necessary to make the exit part of the tube divergent to break this roadblock to supersonic speed. Older textbooks like "Principles of Thermodynamics" by G. A. Goodenough explain this situation carefully. Modern texts usually discuss only the convergent-divergent type of nozzle, without mentioning the name of De Laval, thereby conveying the erroneous idea that the converging part is essential to the attainment of supersonic velocity.

It has been mentioned that it is essential for the purpose of the present invention that the pressure in the antechamber after combustion is equal to or higher than twice the pressure in the main combustion chamber at this time. This limit is necessary, because only when the pressure ratio is supercritical, i. e. when it is greater than about 1.806 for the gases under consideration, will it be possible to achieve supersonic speeds. If, however, the orifice coefficient at the entrance to the nozzle is made very high, the maximum pressure attained in the antechamber will be lowered. Therefore it may be advantageous to design the nozzle entrance with a poor orifice coefficient in cases where deep penetration of the jet in the combustion chamber and consequently high Mach numbers are permissible.

Figs. IV and V illustrate nozzles with progressively worse orifice coefficients at the entrance. In Fig. IV the square edges on the antechamber side will make the orifice coefficient about .62 with respect to the gases leaving this chamber. On the other hand when charging the antechamber with fresh gas mixture coming from the main combustion chamber, the orifice coefficient is about 1. Thus 60% more area is available for charging than for discharging. With the construction of Fig. V this percentage may be as high as 100%.

Having disclosed the general nature of my invention I am aware of the fact that construction very similar to those shown in Figs. I and II have been proposed before. The difference lies in the delicate provisions and proportions, which must be incorporated to arrive at supersonic speeds and without which the effect is very slight or non-existing. In order to more fully disclose just how to make the invention effective, I must make reference to the mathematical relationship that must be satisfied in order to achieve the supersonic velocity necessary in order to attain appreciable suppression of detonation and the other beneficial effects described.

In the first place the ratio $r$ of the maximum absolute pressure $p_1$, reached in the antechamber, to the absolute pressure $p_2$ in the main combustion chamber must be in excess of the well known critical pressure ratio $r_c$:

$$r = \frac{p_1}{p_2} \wedge r_c = \left(\frac{k+1}{2}\right)^{\frac{k}{k-1}}$$

The value of $k$ for the gases and temperatures ordinarily encountered equals 1.25, which makes $r_c = 1.806$.

The ratio $r$ can most easily be determined by measuring the pressure in the antechamber and the main combustion chamber, while varying the size of the throat diameter 15 in the transfer passage by successive experiments.

In the second place after a suitable pressure ratio $r$ has thus been established, the ratio of the exit area $A_2$ to the throat area $A_1$ must be calculated from:

$$\frac{A_2}{A_1} = \sqrt{\frac{k-1}{2}\left(\frac{2}{k+1}\right)^{\frac{k+1}{k-1}} \cdot \frac{r^{\frac{k+1}{k}}}{r^{\frac{k-1}{k}} - 1}}$$

where $k$ is the average adiabatic exponent of about 1.25 for the gases and temperatures normally encountered.

If the ratio is made larger than indicated by the formula, subsonic velocity will result.

If the ratio is made smaller than indicated by the formula, but larger than 1, supersonic speed will be achieved, but the Mach number will be reduced.

If the ratio is made equal to or smaller than 1, subsonic speed will result.

Finally the Mach number i. e. the ratio of the jet speed to the speed of sound may be calculated from:

$$M = \sqrt{\frac{2}{k-1}\left(r^{\frac{k-1}{k}} - 1\right)}$$

Applying these formulas the results may be tabulated as follows:

| $r$ | 2 | 3 | 4 | 5 | 6 |
|---|---|---|---|---|---|
| $\frac{A_2}{A_1}$ | 1.007 | 1.127 | 1.285 | 1.435 | 1.588 |
| $M$ | 1.091 | 1.402 | 1.598 | 1.743 | 1.850 |

What I desire to claim and secure by Letters Patent is:

1. In an internal combustion engine, an engine structure having a main combustion chamber and an antechamber, means for charging both chambers with combustible mixture under pressure, ignition means associated with the antechamber for initiation of combustion therein and a nozzle connecting the two chambers, said nozzle constructed and arranged to accelerate to supersonic speed the combustion products issuing from said antechamber.

2. In an internal combustion engine, an engine structure having a main combustion chamber and an antechamber, means for charging both chambers with combustible mixture under pressure, ignition means associated with the antechamber for initiation of combustion therein and a nozzle connecting the two chambers, said nozzle constructed and arranged to accelerate to supersonic speed the combustion products issuing from said antechamber and said nozzle having a throat sufficiently restricted to permit the gas pressure in the antechamber after combustion to attain a maximum pressure in excess of twice the pressure of the fuel air mixture contained in the main combustion chamber.

3. In an internal combustion engine, an engine structure having a main combustion chamber and an antechamber, means for charging both chambers with combustible mixture under pressure, ignition means associated with the antechamber for initiation of combustion therein and a nozzle having a restricted throat connecting the two chambers, said nozzle constructed and arranged to accelerate to supersonic speed the combustion products issuing from said antechamber, said nozzle having an exit area between 10 and 60% larger than the throat area, said throat area being sufficiently restricted to permit the gas pressure in the antechamber after combustion to attain a maximum pressure in excess of twice the pressure of the fuel air mixture contained in the main combustion chamber.

4. In an internal combustion engine, an engine structure having a main combustion chamber and an antechamber, means for charging both chambers with combustible mixture under pressure, ignition means associated with the antechamber for initiation of combustion therein, and a nozzle comprising a passage connecting the two chambers, said nozzle constructed and arranged to accelerate to supersonic speed the combustion products issuing from said antechamber, said passage having a restricted throat near the antechamber and being divergent toward the main combustion chamber, said throat being sufficiently restricted to permit the gas pressure in the antechamber after combustion to attain a maximum pressure in excess of twice the pressure of the fuel air mixture contained in the main combustion chamber.

5. In an internal combustion engine, an engine structure having a main combustion chamber and an antechamber, means for charging both chambers with combustible mixture under pressure, ignition means associated with the antechamber for initiation of combustion therein, and a nozzle comprising a passage connecting the two chambers, said nozzle constructed and arranged to accelerate to supersonic speed the combustion products issuing from said antechamber, said passage having a restricted throat near the antechamber and being divergent toward the main combustion chamber, said passage having an exit area between 10 and 60% larger than the throat area, said throat area being sufficiently restricted to permit the gas pressure in the antechamber after combustion to attain a maximum pressure of twice the pressure of the fuel air mixture contained in the main combustion chamber.

6. A method for increasing the combustion reaction velocity of combustible mixture of fuel and air, consisting of compressing said mixture in a vessel and injecting in said vessel a jet of highly heated combustion products, flowing at a speed in excess of the velocity of sound.

7. In an internal combustion engine of the reciprocating type, an engine structure having a main combustion chamber provided with an opening in one of its confining walls, an adapter fastened in said opening and having an antechamber formed to receive a sparkplug at its extremity remote from said combustion chamber, a sparkplug assembled to said adapter and communicating with said antechamber inside said adapter and a nozzle comprising a passage connecting the two chambers, said nozzle constructed and arranged to accelerate to supersonic speed the combustion products issuing from said antechamber, said passage having a restricted throat near the antechamber and being divergent toward the main combustion chamber.

8. In an internal combustion engine of the reciprocating type, an engine structure having a main cambustion chamber provided with an opening in one of its confining walls, an adapter fastened in said opening and having an antechamber formed to receive a sparkplug at its extremity remote from said combustion chamber, a sparkplug assembled to said adapter and communicating with said antechamber inside said adapter and a nozzle comprising a passage connecting the two chambers, said nozzle constructed and arranged to accelerate to supersonic speed the combustion products issuing from said antechamber, said passage having a restricted throat near the antechamber and being divergent toward the main combustion chamber, said throat being sufficiently restricted to permit the gas pressure in the antechamber after combustion to attain a maximim pressure in excess of twice the pressure of the fuel air mixture contained in the main combustion chamber.

9. In an internal combustion engine of the reciprocating type, an engine structure having a main combustion chamber provided with an opening in one of its confining walls, an adapter fastened in said opening and having an antechamber formed to receive a sparkplug at its extremity remote from said combustion chamber, a sparkplug assembled to said adapter and communicating with said antechamber inside said adapter, and a nozzle comprising a passage connecting the two chambers, said nozzle constructed and arranged to accelerate to supersonic speed the combustion products issuing from said antechamber, said passage having a restricted throat near the antechamber and being divergent toward the main combustion chamber and having an exit area between 10 and 60% larger than the throat area, said throat being sufficiently restricted to permit the gas pressure in the antechamber after combustion to attain a maximum pressure in excess of twice the pressure of the fuel air mixture contained in the main combustion chamber.

10. In an internal combustion engine of the reciprocating type, an engine structure having a main combustion chamber provided with an opening in one of its confining walls, an adapter fastened in said opening and having an antechamber formed to receive a sparkplug at its extremity remote from said combustion chamber, a sparkplug assembled to said adapter and communicating with said antechamber inside said adapter and a nozzle comprising a passage connecting the two chambers, said nozzle constructed and arranged to accelerate to supersonic speed the combustion products issuing from said antechamber, said passage having in the direction from the antechamber to the main combustion chamber a converging portion followed by a throat and having an exit area between 10 and 60% larger than the throat area, said throat being sufficiently restricted to permit the gas pressure in the antechamber after combustion to attain a maximum pressure in excess of twice the pressure of the fuel air mixture contained in the main combustion chamber.

11. In an internal combustion engine of the reciprocating type, an engine structure having a main combustion chamber provided with an opening in one of its confining walls, an adapter fastened in said opening and having an antechamber formed to receive a sparkplug at its extremity remote from said combustion chamber, a sparkplug assembled to said adapter and communicating with said antechamber inside said adapter and a nozzle comprising a passage connecting the two chambers, said nozzle constructed and arranged to accelerate to supersonic speed the combustion products issuing from said antechamber, said passage having in the direction from the antechamber to the main combustion chamber a sharp edged entrance followed by a throat, and having an exit area between 10 and 60% larger than the throat area, said throat being sufficiently restricted to permit the gas pressure in the antechamber after combustion to attain a maximum pressure in excess of twice the pressure of the fuel air mixture contained in the main combustion chamber.

12. In an internal combustion engine of the reciprocating type; an engine structure having a main combustion chamber provided with an opening in one of its confining walls, an adapter fastened in said opening and having an antechamber formed to receive a sparkplug at its extremity remote from said combustion chamber, a sparkplug assembled to said adapter and communicating with said antechamber inside said adapter and a nozzle comprising a passage connecting the two chambers, said nozzle constructed and arranged to accelerate to supersonic speed the combustion products issuing from said antechamber, said passage having in the direction from the antechamber to the main combustion chamber a tubular projection at the entrance projecting into the antechamber followed by a throat and having an exit area between 10 and 60% larger than the throat area, said throat being sufficiently restricted to permit the gas pressure in the antechamber after combustion to attain a maximum pressure in excess of twice the pressure of the fuel air mixture contained in the main combustion chamber.

13. In a gas turbine engine, an engine structure having a main combustion chamber provided with an opening in its confining walls in the region of its normal combustion zone, an adapter fastened in said opening and having an antechamber, a glowplug having its glowwire projecting in the antechamber, means for supplying the antechamber with air at a pressure in excess of twice the pressure in the main combustion chamber, means for spraying fuel in the antechamber at a location upstream of the glowplug and a nozzle between the antechamber and the main combustion chamber, said nozzle constructed and arranged to accelerate to supersonic speed the combustion products issuing from the antechamber and said nozzle having a converging-diverging passage connecting said chambers and providing a restricted throat between said chambers, said nozzle having an exit area between 10 and 60% larger than the throat area, said throat area being sufficiently restricted to maintain a pressure in the antechamber in excess of twice the pressure in the main combustion chamber.

References Cited in the file of this patent

UNITED STATES PATENTS

| | | |
|---|---|---|
| 1,523,454 | Shepherd | Jan. 20, 1925 |
| 2,033,155 | Scott | Mar. 10, 1936 |
| 2,041,708 | Harper | May 26, 1936 |
| 2,065,419 | Bagnulo | Dec. 22, 1936 |
| 2,173,081 | Barkeij | Sept. 12, 1939 |
| 2,199,706 | Mallory | May 7, 1940 |
| 2,238,852 | Regar | Apr. 15, 1941 |
| 2,314,175 | Summers | Mar. 16, 1943 |
| 2,316,790 | Hickey | Apr. 20, 1943 |
| 2,456,080 | Wu Pe | Dec. 14, 1948 |
| 2,642,054 | Wright | June 16, 1953 |

FOREIGN PATENTS

| | | |
|---|---|---|
| 193,787 | Great Britain | Mar. 1, 1923 |
| 216,391 | Great Britain | May 29, 1924 |
| 443,348 | Great Brtain | Feb. 26, 1936 |